Patented June 11, 1940

2,203,768

UNITED STATES PATENT OFFICE 2,203,768

ANTIHALATION PHOTOGRAPHIC ELEMENT

Walter D. Baldsiefen, Metuchen, N. J., assignor to Du Pont Film Manufacturing Corporation, New York, N. Y., a corporation of Delaware No Drawing. Application January 25, 1938, Serial No. 186,908

10 Claims. (Cl. 95—9)

This invention relates to antihalation layers for photographic plates and films; more particularly it relates to water soluble antihalation layers for photographic plates and films. The invention also pertains to daylight loading film cartridges.

This invention has for an object the preparation of an improved daylight loading film cartridge. A further object is the preparation of an improved antihalation layer for photographic plates and films. A still further object is the preparation of a non-tacky antihalation layer for photographic plates or films. A still further object is the preparation of a readily water soluble antihalation layer for photographic plates or films. Other objects will appear hereinafter.

The above and other objects are accomplished by the following invention which comprises coating a photographic plate or film base with a hydrophilic colloid containing a light screening dye or pigment and a small amount of a higher alcohol sulfate. The colloids which I found to be useful are the water-soluble carbohydrate glycollates, e. g., sodium starch glycollate, sodium cellulose glycollate, potassium starch glycollate, potassium cellulose glycollate, etc.

Any of the well-known screening dyes or pigments which are absorptive of light of wave lengths at which the photographic emulsion is sensitive may be used in the antihalation layer.

The higher alcohol sulfates which are useful according to this invention are monosulfuric acid esters and the salts thereof of aliphatic monohydric alcohols containing at least 8 and preferably 12 to 18 carbon atoms. As examples of such compounds mention is made of sodium octyl sulfate, potassium decyl sulfate, sodium dodecyl sulfate, sodium hexadecyl sulfate, sodium oleyl sulfate, and ammonium octadecyl sulfate.

In practicing the invention a solution is made by adding the carbohydrate glycollate, a water soluble dye or pigment of sufficient tinctorial strength to stop the passage of light rays and the higher alcohol sulfate to an aqueous medium. The aqueous medium may be water alone, or a mixture of water with a water miscible solvent such as methanol, ethanol, and acetone. The solution is applied to the back of the transparent plate or film support. Any conventional coating method may be used, such as a transfer or beading roller, spraying, immersion beading, etc.

The invention will be further illustrated but is not intended to be limited by the following examples:

Example I

| | | |
|---|---|---|
| Sodium cellulose glycollate | grams | 40 |
| Sodium dodecyl sulfate | do | 20 |
| Alkali blue | do | 40 |
| Water | cc | 2000 |
| Alcohol | cc | 500 |

The glycollate, dodecyl sulfate and dye were added to the water alcohol mixture. The slightly viscous mixture obtained thereby was coated on the rear face of a film support which contained upon its front face a panchromatic emulsion, by means of beading and allowed to dry.

The resulting film was found to have excellent antihalation characteristics and was free from tackiness. The antihalation layer after exposure of the film was rapidly dissolved from the film base by rinsing in cold water.

Example II

| | | |
|---|---|---|
| Na Starch glycollate | grams | 25 |
| Sodium oleyl sulfate | do | 35 |
| Nigrosine | do | 40 |
| Water | cc | 3500 |
| Alcohol | cc | 500 |

The solution was coated upon a film base which carried upon its face a light sensitive emulsion in the same manner as described in Example I.

The antihalation layer was found to be very uniform in character, free from coating streaks and repellent spots, had a reduced coefficient of friction, and was non-tacky in character. The layer dissolved completely and rapidly upon soaking in plain cold water maintained at a temperature of about 55–70° F.

In place of the specific dyes described in the above examples, any suitable water soluble dye may be substituted, or one may use a water dispersible pigment or lake. As an example of a composition suitable for a pigment layer which is non-selective color absorbing, mention is made of a mixture of about 1 part of Prussian blue dispersed with about 4 parts of manganese dioxide. A dye composition for a similar purpose may comprise 1 part of Fuchsine, 1 part of Rhodamine and 3 parts of acid green. Various other mixtures of the dyes and/or pigments may be used. The particular pigment or dye chosen, of course, will depend upon the nature of the light sensitive emulsion layer. Thus, if the emulsion layer is sensitive to a certain range of light, a dye will be chosen which is absorptive of light over the same range.

As examples of suitable dyes which may be substituted mention is made of the following:

| | |
|---|---|
| Auramine | Acid Blue Black |
| Helianthin | Rhodamine |
| Brilliant Yellow S | Fuchsine |
| Chrysoin | Acid Green |
| Crystal Violet | Safranine G |
| Ponceau 6R | Safranine O |
| Crocein Scarlet | Ponceau 2R |
| Diamond Black | Spirit Solution Nigrosine |
| Azorubin | Metanil Yellow |

In place of the sodium cellulose glycollate and sodium starch glycollate of the examples any water-soluble starch or cellulose glycollate may be substituted. For example, the water soluble ammonium and substituted ammonium salts and calcium and magnesium salts have been found to have utility. Mixtures may be used.

In place of the sodium dodecyl sulfate and sodium oleyl sulfate of the examples, other water-soluble higher alcohol sulfates may be substituted. As examples of such compounds, in addition to those mentioned above, are diethyl cyclohexylamine salt of sulfated dodecyl sulfate, the triethanolamine salt of technical octadecyl alcohol sulfate, trimethylamine dodecyl sulfate, cyclohexylamine octadecyl sulfate, piperidine hexodecyl sulfate, and tetraethyl ammonium dodecyl sulfate. Mixtures of any of the above salts may be used. A homologous mixture such as the sodium salts of the sulfated alcohols obtained from the hydrogenation of coconut oil which is a mixture of octadecyl, dodecyl, tetradecyl, hexadecyl and octadecyl alcohols predominating in dodecyl and tetradecyl, etc. has considerable utility in the process.

The ratio of the alcohol sulfate to the glycollate may vary widely. The range between one part of alcohol sulfate to 20 of glycollate and 2 parts of alcohol sulfate to 1 of glycollate represents a practical range. The ratio of the dye to the alcohol sulfate plus glycollate may likewise vary over a wide range. The range of 1 part of the dye to 20 of the mixture to 2 parts of the dye to 1 part of the mixture represents a practical range.

I am aware of the fact that compounds have been added to materials used for forming antihalation layers which have some surface tension lowering properties. Thus, I am aware of the fact that saponine has been added to antihalation coating compositions as a spreading agent to enable the formation of a uniform smooth coating. The agents of the present invention have entirely different properties and allow the film to be quickly and completely dissolved without the formation of flakes or large skin-like bodies.

The results which are obtained by adding small amounts of the higher aliphatic alcohol sulfates to antihalation coating compositions composed of carbohydrate glycollates are rather surprising in view of the fact that the compounds do not have any beneficial effect upon the rather closely related water-soluble carbohydrate ether coatings such as a coating of methyl starch.

Applicant wishes to emphasize the fact that the alcohol sulfates are not added because of their surface tension lowering properties although such properties are perhaps also exhibited in this relationship. They are added to the coating compositions in much larger amounts than that which is necessary to give a good surface tension lowering effect. The alcohol sulfates have been found to possess new and unexpected properties which are not possessed by other agents. Thus, they prevent tackiness at high humidities in the compositions above described. They also act as film lubricants and prevent scratching particularly during handling such as winding upon reels etc. and in photographic apparatus. When Turkey red oil, for example, is substituted for the alcohol sulfates of the preceding examples, the resulting coating is sticky and streaky in character even at low humidities. A pure grade of soap when substituted for the alcohol sulfates renders the resulting coating quite gummy and streaky in character in addition to other undesirable characteristics.

This invention possesses the advantage that a nontacky antihalation layer which is readily soluble in water may be quickly prepared. The layer dissolves completely in cold water and does not become disengaged as a skin or membrane which may later cause difficulties by adhering to the emulsion surface. Another advantage of the use of the higher alcohol sulfates resides in the fact that the glycollate coating composition containing the same has very good film forming characteristics. The film adheres tenaciously to the base and does not separate from the same prior to processing the film.

The higher alcohol sulfates are further advantageous in that they prevent the coagulation of color particles of some dyes or pigments.

As many apparently widely different embodiments of this invention may be made without departing from the spirit and scope thereof, it is to be understood that we do not limit ourselves to the embodiment thereof except as defined in the appended claims.

I claim:

1. An article of manufacture comprising a transparent support, a coating of sensitized photographic material on one side of the support, and a layer coated on the other side of the support formed of a water soluble carbohydrate glycollate which layer contains a water soluble sulfate of an aliphatic monohydric alcohol containing at least 8 carbon atoms and an antihalation dye.

2. An article of manufacture comprising a transparent support, a coating of sensitized photographic material on one side of the support, and a layer coated on the other side of the support formed of a water soluble carbohydrate glycollate which layer contains a water soluble salt of an alkyl sulfate containing 12 to 18 carbon atoms and a material absorptive of the rays to which the photographic coating is sensitized.

3. An article of manufacture comprising a transparent support, a coating of sensitized photographic material on one side of the support, and a layer coated upon the other side of the support formed of a water-soluble alkali metal carbohydrate glycollate which layer contains a water soluble salt of a sulfate of an aliphatic monohydric alcohol containing from 12 to 18 carbon atoms and a material absorptive of the rays to which the photographic coating is sensitized the ratio of alcohol sulfate to carbohydrate glycollate being within the range of 1 part of the former to 20 parts of the latter to 2 parts of the former to 1 part of the latter.

4. The article of claim 3 wherein the carbohydrate glycollate is cellulose glycollate.

5. The article of claim 3 wherein the carbohydrate glycollate is starch glycollate.

6. An article of manufacture comprising a transparent support, a coating of sensitized photographic material on one side of the support, and a layer coated upon the other side of the support formed of a water-soluble alkali metal carbohydrate glycollate which layer contains an alkali metal alkyl sulfate containing 12 to 18 carbon atoms and a material absorptive of the rays to which the photographic coating is sensitized.

7. A coating composition comprising a water-soluble carbohydrate glycollate, a water soluble sulfate of an aliphatic monohydric normal alcohol containing at least 8 carbon atoms and an antihalation dye.

8. A coating composition comprising a water-soluble alkali metal carbohydrate glycollate, a water-soluble alkali metal alkyl sulfate containing 12 to 18 carbon atoms and an antihalation dye.

9. A daylight loading cartridge of photographic film including a coiled film band, said band comprising a support of light transmitting cellulosic material carrying upon one surface a light sensitive photographic layer and directly upon the other surface a water-soluble carbohydrate glycollate layer containing a water-soluble sulfate of an aliphatic monohydric alcohol containing at least 8 carbon atoms and a material which is absorptive of the rays to which the photographic material is sensitive.

10. A daylight loading cartridge of photographic film comprising a reel with imperforate side flanges and a band wound thereon, said band comprising a support of light transmitting cellulosic material carrying upon one surface a light sensitive photographic layer and directly upon the other surface a water soluble carbohydrate glycollate layer containing a water-soluble sulfate of an aliphatic monohydric alcohol containing at least 8 carbon atoms and a material which is absorptive of the rays to which the photographic material is sensitive.

WALTER D. BALDSIEFEN.